United States Patent
Zhang

(10) Patent No.: US 12,342,925 B2
(45) Date of Patent: Jul. 1, 2025

(54) BACKPACK WITH COOLING AND TEMPERATURE-LOWERING FUNCTIONALITY

(71) Applicant: Fang Zhang, Chongqing (CN)

(72) Inventor: Fang Zhang, Chongqing (CN)

(*) Notice: Subject to any disclaimer, the term of this patent is extended or adjusted under 35 U.S.C. 154(b) by 165 days.

(21) Appl. No.: 18/462,426

(22) Filed: Sep. 7, 2023

(65) Prior Publication Data

US 2024/0292937 A1 Sep. 5, 2024

(30) Foreign Application Priority Data

Mar. 2, 2023 (CN) .......................... 202320372646.7

(51) Int. Cl.
| | |
|---|---|
| *A45F 3/04* | (2006.01) |
| *F25B 21/02* | (2006.01) |
| *A45F 3/00* | (2006.01) |
| *A45F 3/12* | (2006.01) |

(52) U.S. Cl.
CPC ................ *A45F 3/04* (2013.01); *F25B 21/02* (2013.01); *A45F 2003/003* (2013.01); *A45F 2003/125* (2013.01); *F25B 2321/0251* (2013.01)

(58) Field of Classification Search
CPC .. A45F 3/04; A45F 3/042; A45F 3/047; A45F 3/06; A45F 3/08; A45F 2003/125
USPC .......................... 224/576, 627–659; 62/259.3
See application file for complete search history.

(56) References Cited

U.S. PATENT DOCUMENTS

| | | | | |
|---|---|---|---|---|
| 6,023,932 | A * | 2/2000 | Johnston | A61F 7/007 62/3.5 |
| 7,231,777 | B1 * | 6/2007 | Arnold | F24F 1/022 62/259.3 |
| 8,225,974 | B2 * | 7/2012 | Zheng | A45F 3/047 224/628 |
| 9,204,674 | B2 * | 12/2015 | Bujold | A45F 3/14 |
| 10,495,356 | B2 * | 12/2019 | Ye | F25B 21/02 |
| 10,499,722 | B2 * | 12/2019 | Squires | A45F 3/04 |
| 10,555,594 | B2 * | 2/2020 | Tai | A45F 3/04 |
| 11,278,103 | B2 * | 3/2022 | Chang | A45F 3/14 |
| 11,864,644 | B2 * | 1/2024 | Tai | A45F 3/04 |
| 2005/0246826 | A1 * | 11/2005 | McCarter | A41D 13/0053 2/458 |

(Continued)

FOREIGN PATENT DOCUMENTS

| | | | |
|---|---|---|---|
| CN | 2745412 Y | * | 12/2005 |
| CN | 202027053 U | * | 11/2011 |

(Continued)

*Primary Examiner* — Justin M Larson

(57) ABSTRACT

A backpack with cooling and temperature-lowering functionality, which includes a backpack main body with a cavity and shoulder straps. A ring-shaped flexible protrusion is set on the back of the backpack main body, upon which is a flexible support for contact with the human back. A chamber is formed between the back of the backpack main body, the ring-shaped flexible protrusion, and the flexible support. A cooling unit is located on the outer side of the ring-shaped flexible protrusion, comprising a housing that is detachably mounted on the backpack main body, a TEC cooling plate located inside the housing, and a fan. The housing has a cold air nozzle that is inserted through the ring-shaped flexible protrusion and extends into the chamber to input cold air, thereby cooling the human back and making the user feel more comfortable.

10 Claims, 7 Drawing Sheets

(56) References Cited

U.S. PATENT DOCUMENTS

| | | | | |
|---|---|---|---|---|
| 2010/0155447 | A1* | 6/2010 | Zheng | A45C 15/00 |
| | | | | 224/629 |
| 2019/0075912 | A1* | 3/2019 | Squires | A45F 3/04 |
| 2019/0093929 | A1* | 3/2019 | Ye | A45F 3/04 |
| 2023/0232966 | A1* | 7/2023 | Tai | A45F 3/04 |
| | | | | 224/576 |

FOREIGN PATENT DOCUMENTS

| | | | | | |
|---|---|---|---|---|---|
| CN | 104366959 | B | * | 6/2016 | |
| CN | 106617631 | A | * | 5/2017 | |
| CN | 107087885 | A | * | 8/2017 | A45F 3/042 |
| CN | 107183901 | A | * | 9/2017 | |
| CN | 109106048 | A | * | 1/2019 | |
| CN | 113892746 | A | * | 1/2022 | |
| CN | 113907503 | A | * | 1/2022 | |
| CN | 114224058 | A | * | 3/2022 | |
| CN | 216019666 | U | * | 3/2022 | |
| CN | 116138564 | A | * | 5/2023 | |
| CN | 219556598 | U | * | 8/2023 | A45F 3/04 |
| CN | 116831372 | A | * | 10/2023 | |
| CN | 118680379 | A | * | 9/2024 | |
| CN | 119022490 | A | * | 11/2024 | |
| KR | 101048421 | B1 | * | 7/2011 | |
| KR | 20160004171 | A | * | 1/2013 | |
| KR | 20240016554 | A | * | 2/2024 | |
| KR | 20240175665 | A | * | 12/2024 | |
| WO | WO2006068072 | A1 | * | 6/2006 | |
| WO | WO-2023240808 | A1 | * | 12/2023 | |

* cited by examiner

BACKPACK WITH COOLING AND TEMPERATURE-LOWERING FUNCTIONALITY

TECHNICAL FIELD

This present invention pertains to the field of consumer goods, specifically a backpack with cooling and temperature-lowering functionality.

BACKGROUND ART

As living standards have improved, more and more people are traveling or going on business trips, leading to a variety of travel accessories like backpacks and suitcases. Due to their small size and light weight, backpacks are often used for short trips or even daily commuting to carry small items. Existing backpacks usually have a large area in contact with the wearer's back, and they tend to be rather heavy and not breathable, causing discomfort and a rise in back temperature when worn for extended periods, which in severe cases could lead to heatstroke.

Some cooling backpacks have emerged, such as the one patented under CN202122501595. It includes a backpack body equipped with shoulder straps. Inside the backpack body is a control circuit with a microprocessor. The backpack body also has a cavity, the bottom of which is equipped with a through-hole. Above this hole is an exhaust fan, and next to the exhaust fan is a thermoelectric cooling plate. Through the cooling plate, the incoming air can be cooled. The cavity also contains a power source. Both sides of the cavity have air holes equipped with threaded segments, which are connected to a first pipe featuring an air outlet. This air outlet is threadingly connected to a second pipe. When not in use, the second pipe can be rotated back into the first pipe, which can then be rotated back into the air hole for storage. The external wall of the backpack body has a recess. Inside this recess is a first fastener, which is hinged to a second fastener. The first fastener has a first fixing hole, and the second fastener has a second fixing hole. A gas transmission pipe is fitted over the second pipe, passing through the first and second fixing holes. A control rod is located between the shoulder straps. The microprocessor is electrically connected to the exhaust fan, the power source, and the thermoelectric cooling plate.

Shortcomings of the Existing Cooling and Temperature-Lowering Backpack:

The exhaust fan is located above the through-hole at the bottom of the cavity inside the backpack body. The power source and thermoelectric cooling plate are also situated inside this cavity, adjacent to the exhaust fan. This design occupies valuable space within the backpack, affecting its storage capacity. Moreover, the exhaust fan, power source, and cooling plate must all be fixed to the bottom of the cavity, making them inconvenient to install or remove, and complicating maintenance. There is also no structure on the backside of the backpack to enhance user comfort.

The exhaust fan operates to draw air into the cavity, where it is cooled by the thermoelectric cooling plate. The user then rotates a handle on the first pipe to bring it out of the cavity's air hole and similarly rotates the second pipe out of its air outlet. Sealing discs are used to ensure there are no air leaks. The user then flips the assembly out of the backpack's recess using a second handle located on the first fastener. This gas transmission pipe passes through fixing holes in the first and second fasteners, securing it in place. A control rod between the shoulder straps allows the user to adjust the distance between the backpack body and their back to improve ventilation. This design is not only complex but also cumbersome to operate, which is not conducive to market competitiveness.

SUMMARY OF THE INVENTION

The objective of this present invention is to overcome the shortcomings of existing technology by providing a backpack with cooling and temperature-lowering functionality.

To solve the above technical issues, this present invention adopts the following technical solution:

A backpack with cooling and temperature-lowering functionality comprising a backpack main body with a cavity and shoulder straps mounted on the backpack main body, wherein a ring-shaped flexible protrusion is placed on a backside of the backpack main body, upon which is a layer of flexible support for contact with the human back; a chamber is formed between the back of the backpack main body, the ring-shaped flexible protrusion, and the flexible support; and a cooling unit located on an outer side of the ring-shaped flexible protrusion includes a housing detachably mounted on the backpack main body, a TEC cooling plate located inside the housing, and a fan for drawing external air and blowing the external air towards the cooling end of the TEC cooling plate to generate cold air; the housing has a cold air nozzle inserted through the ring-shaped flexible protrusion and extending into the chamber to input cold air.

More preferably, the interior of the housing includes a cold air channel and a hot air channel; the TEC cooling plate is placed at a front end of the cold air channel and hot air channel and at a rear end of the fan; the cooling end of the TEC cooling plate corresponds with the cold air channel, and the heat-dissipating end of the TEC cooling plate corresponds with the hot air channel; a heat-exhaust vent is disposed on the housing in communication with the hot air channel and an air intake is disposed on the housing corresponding to the fan; and the cold air nozzle is connected to the cold air channel.

More preferably, the housing includes a bottom shell and a top cover that are snap-locked together.

More preferably, the cold air nozzle is perpendicular to the housing and is L-shaped.

More preferably, the cold air nozzle is detachably mounted to the housing.

More preferably, an inner chamber of the cold air nozzle gradually narrows from one end to the other.

More preferably, the ring-shaped flexible protrusion includes an insertion port that communicates with the chamber; and the cold air nozzle is inserted through this insertion port.

More preferably, a mesh bag is provided on one side of the backpack main body; one end of the housing is inserted into this mesh bag, and the other end having the cold air nozzle protrudes from the mesh bag; and the mesh bag opening features a retractable drawstring.

More preferably, the ring-shaped flexible protrusion is made of EVA material.

More preferably, the flexible support is made of mesh fabric.

Based on the technical solutions provided above, the present invention has the following beneficial effects compared to existing technologies: When in use, the TEC cooling plate operates, and simultaneously, the fan draws external air into the housing and blows it toward the cooling end of the TEC cooling plate. The air then turns into cold air after passing through the cooling end of the TEC cooling plate. This cold air is input into the chamber through the cold air nozzle and continuously circulates within the chamber, thereby cooling the human back and making the user feel more comfortable.

Compared to the cooling backpacks described in existing technologies, the present invention has a simpler structure. The ring-shaped flexible protrusion and the flexible support added to the back of the backpack body make contact with the human back and form an elastic support, making the backpack fit more closely to the human back. This allows for a more comfortable experience for the user. Moreover, the cooling unit does not require any additional complex controls, making it more convenient to use.

Additionally, the cooling unit is detachable, facilitating easy maintenance and care for the backpack. When the weather is relatively cold (e.g., below 15° C.), the cooling unit can still function for cooling purposes. Alternatively, the cooling unit can be detached from the backpack body, allowing it to function as a conventional backpack, making it more flexible to use.

DETAILED DESCRIPTION OF THE EMBODIMENTS

Further clarification of this present invention is provided below with specific examples and attached diagrams.

Figure 1:
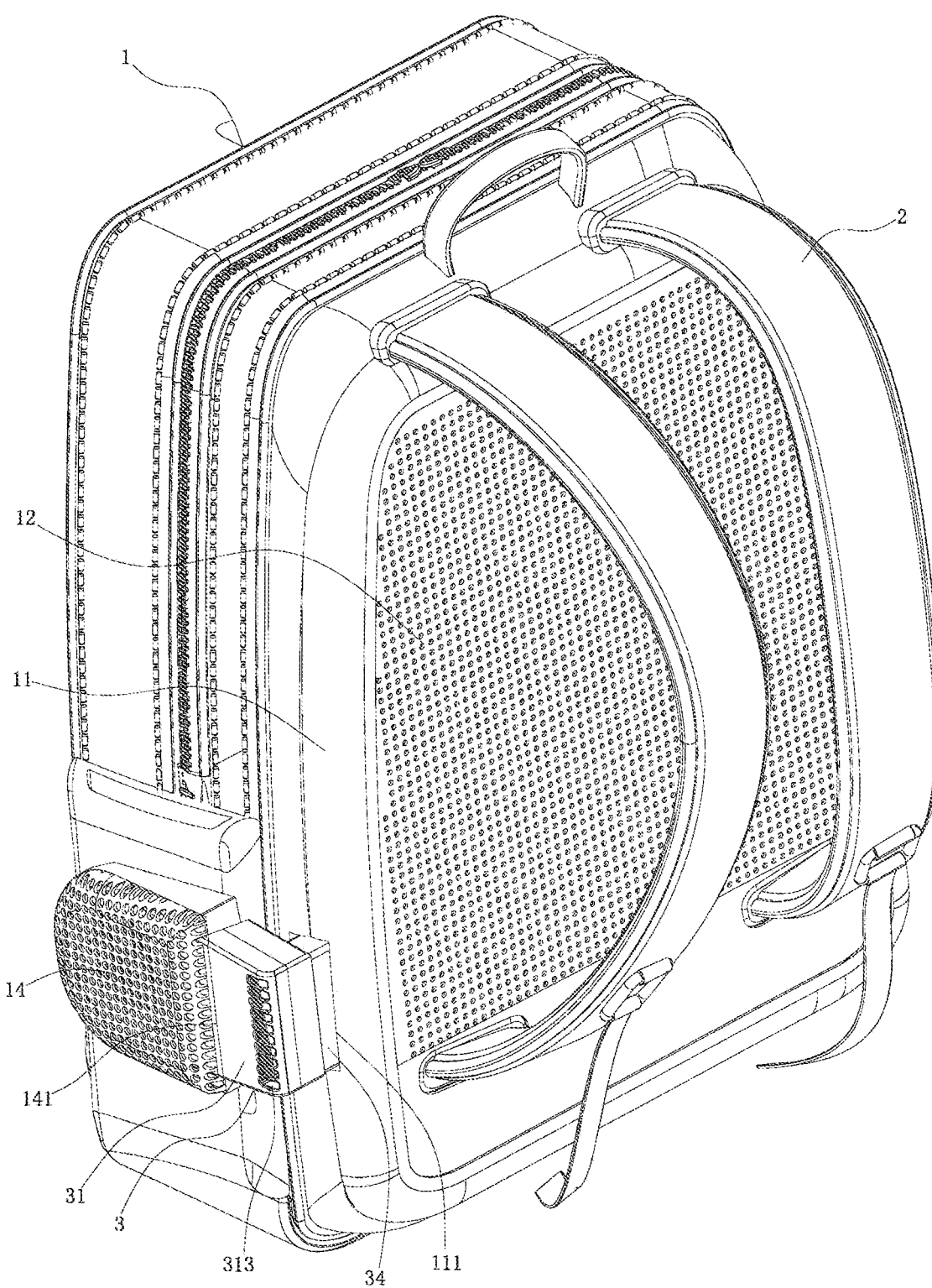
FIG. 1 is a perspective view of the present invention equipped with a cooling unit.
Figure 2:
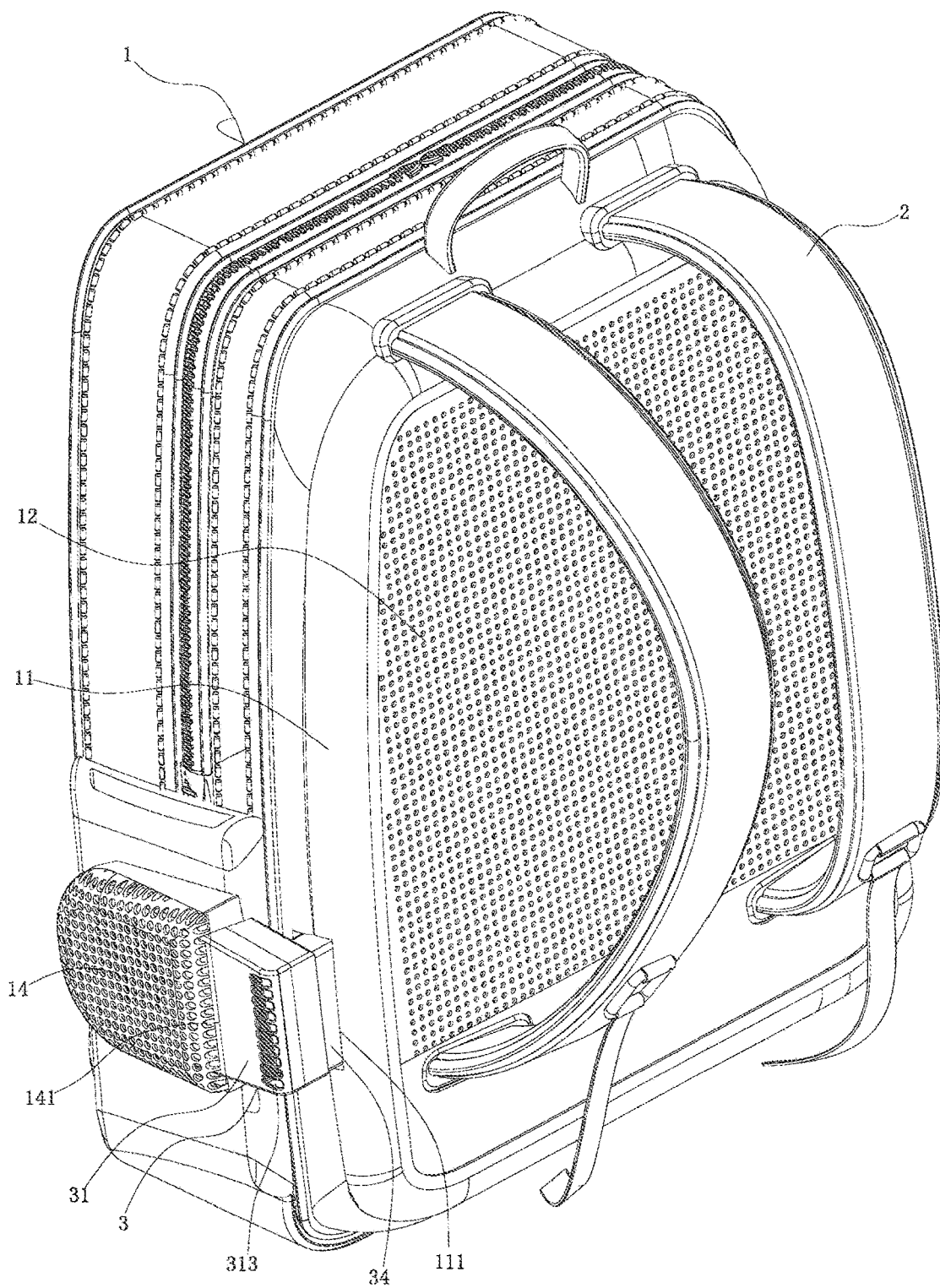
FIG. 2 is a perspective view of the present invention without the cooling unit.
Figure 3:
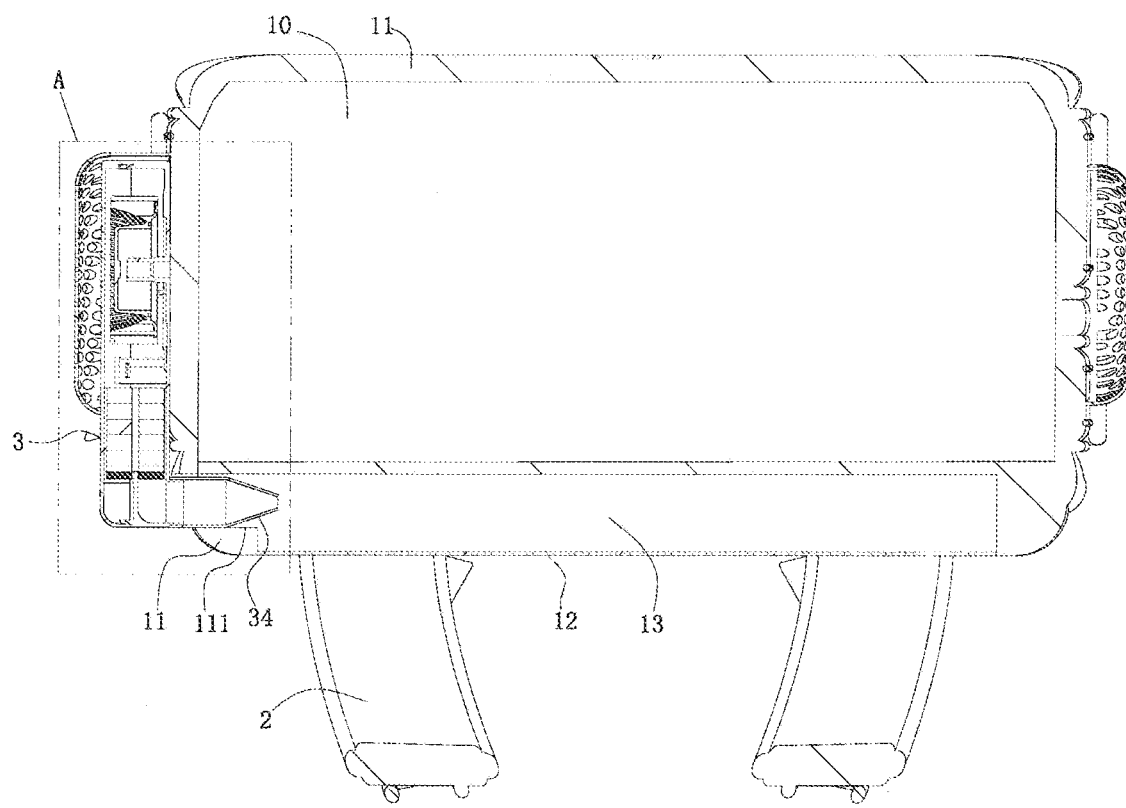
FIG. 3 is a cross-sectional view of the present invention.
Figure 4:
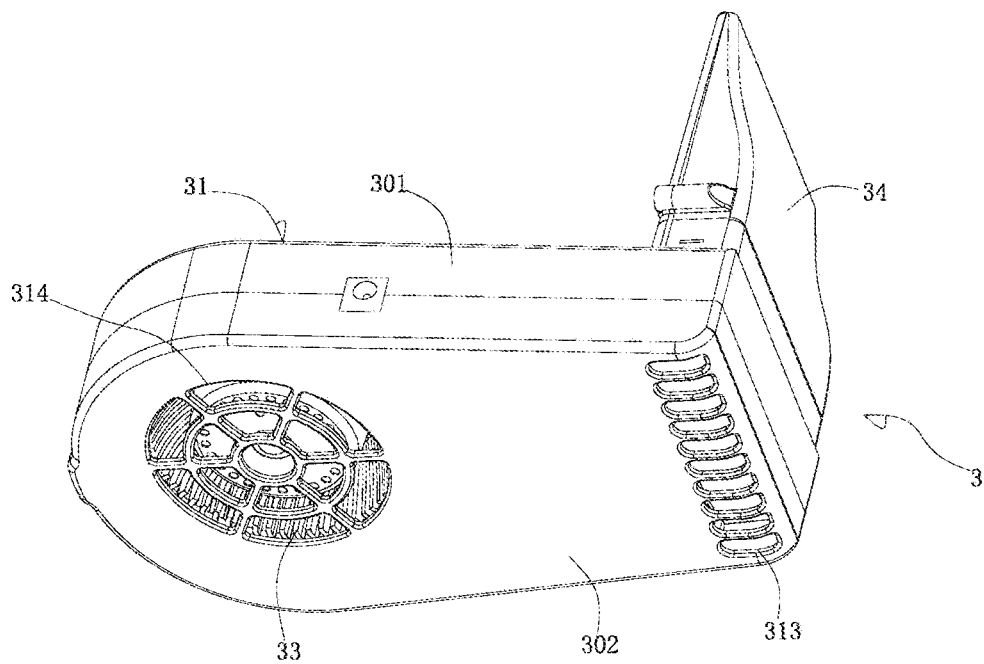
FIG. 4 is a perspective view of the cooling unit in the present invention.
Figure 5:
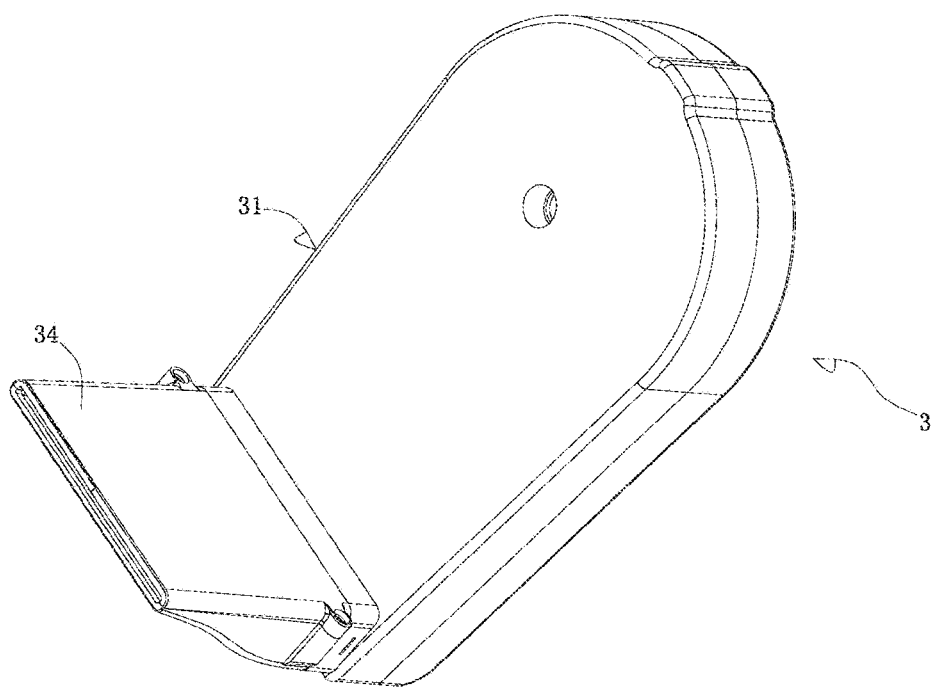
FIG. 5 is a perspective view of the cooling unit from another angle in the present invention.
Figure 6:
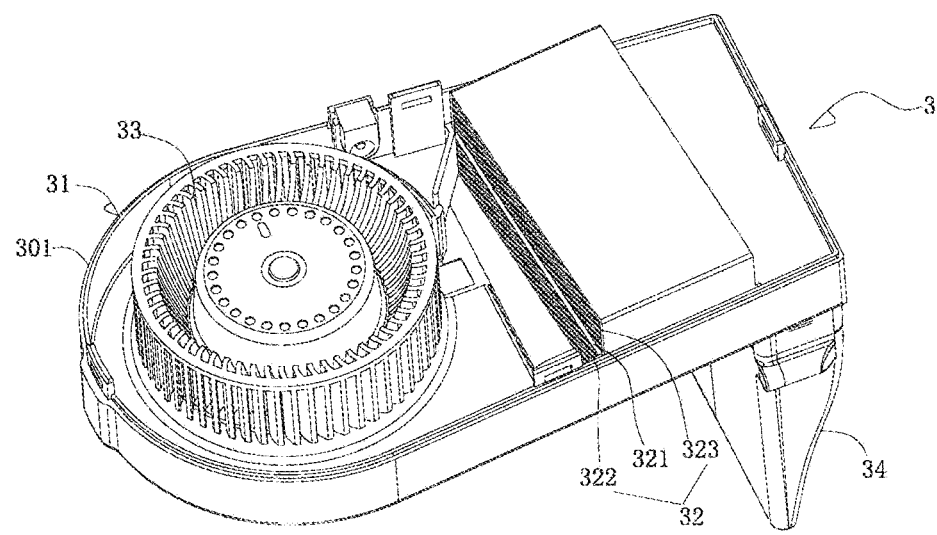
FIG. 6 is a perspective view of the cooling unit with the top cover removed in the present invention.
Figure 7:
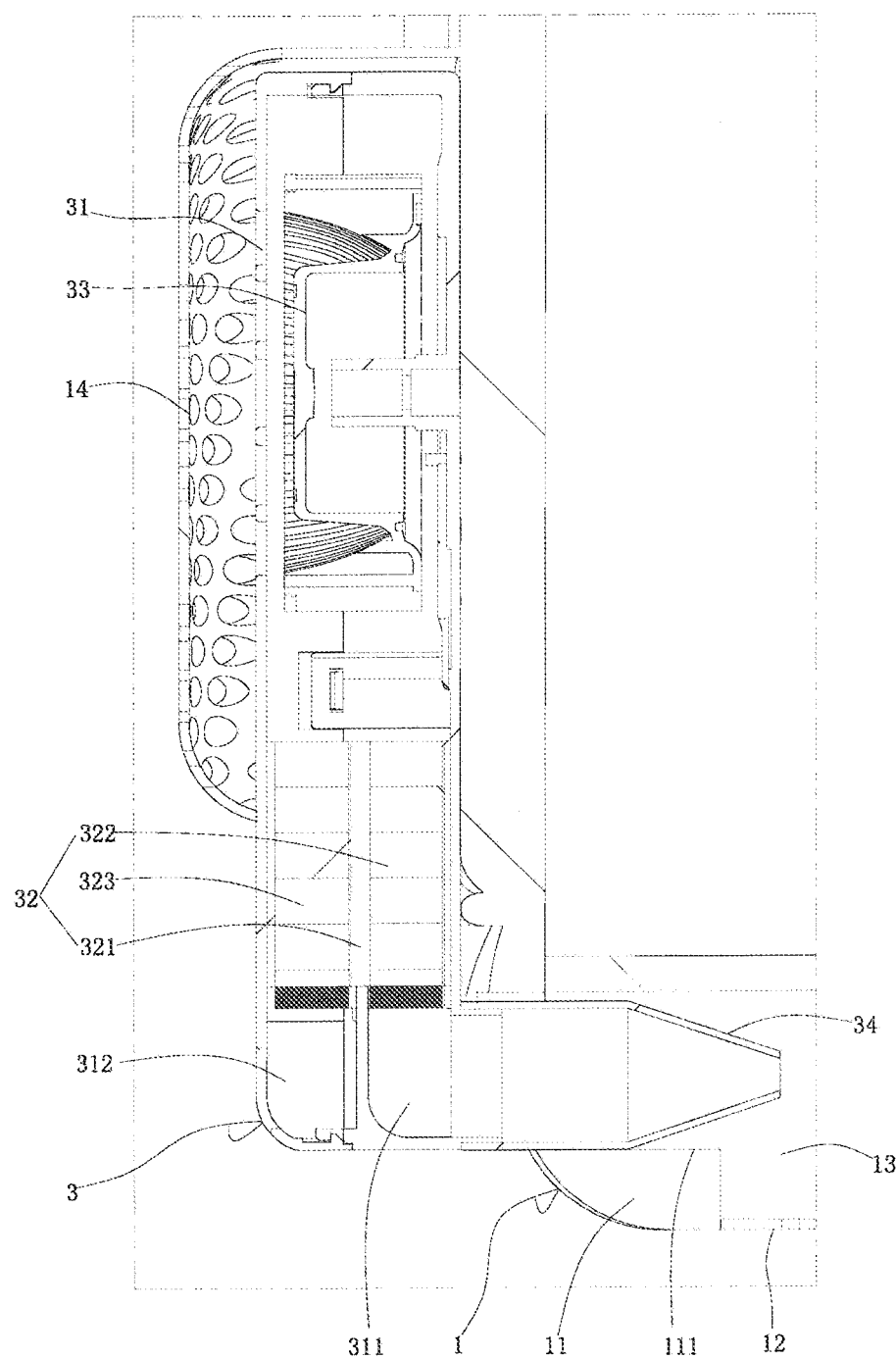
FIG. 7 is an enlarged view of Section A in FIG. 3.

As illustrated in FIGS. 1-7, the invention relates to a backpack with cooling functionality. The backpack includes a main body 1 with a storage compartment 10 and shoulder straps 2 mounted on the main body 1. During use, items are placed into the storage compartment 10 of the main body 1, and the user carries the backpack by wearing the shoulder straps 2, thereby facilitating convenient transport of the items.

The back of the main body 1 is equipped with a circular flexible protrusion 11, upon which a flexible support 12 is mounted for contacting the user's back. A cavity 13 is formed between the back of the main body 1, the circular flexible protrusion 11, and the flexible support 12. During use, this configuration provides elastic support and better conforms to the user's back, thereby enhancing comfort. The cavity 13 becomes a sealed chamber upon contacting the user's back.

A cooling unit 3 is installed on the outer side of the circular flexible protrusion 11. The cooling unit 3 consists of a housing 31 detachably mounted to the main body 1, a thermoelectric cooling TEC plate 32 placed within the housing 31, and a fan 33 for drawing ambient air into the housing 31 and directing it towards the cooling end 321 of the TEC plate 32 to generate cold air. The housing 31 features an air vent 34, which penetrates the circular flexible protrusion 11 and extends into the cavity 13 for introducing cold air. When in use, the TEC plate 32 is activated and the fan 33 draws air into the housing 31, which is then cooled by the TEC plate 32 and introduced into the cavity 13. This cooled air circulates within the cavity 13 to cool the user's back, enhancing comfort.

Compared to conventional cooling backpacks cited in prior art, this design is more straightforward. The circular flexible protrusion 11 and flexible support 12 better conform to the user's back, making the backpack more comfortable to wear. The cooling unit 3 does not require complex operation and is easily detachable, making it convenient for maintenance. Furthermore, in cooler weather conditions, e.g., below 15° C., the cooling unit 3 can be detached, converting the specialized backpack into a regular one, thus increasing its versatility.

To enhance the cooling effect, two cooling units 3 are installed on both sides of the main body 1, each serving to introduce cold air into the cavity 13.

The cooling unit 3 has an external DC port, which can be connected to a portable power source via a power cord to provide electricity. Alternatively, the cooling unit 3 may contain an internal lithium battery for power, which can be charged via the DC port, facilitating wireless use and added convenience.

The circular flexible protrusion 11 is made of EVA material, offering excellent elastic support. This enables the backpack to better conform to the user's back, enhancing comfort. Of course, other materials, such as high-resilience foam, can also be used for the circular flexible protrusion 11.

The flexible support 12 is made of mesh fabric, which allows for better air permeability, thus effectively transferring the cold air to the user's back for improved cooling. Other types of fabric can also be used for the flexible support 12 to achieve similar breathability.

The circular flexible protrusion 11 has a plug-in port 111 connecting to the cavity 13. The cold air vent 34 passes through this plug-in port 111. Due to the elasticity of the circular flexible protrusion 11, the cold air vent 34 and plug-in port 111 are secured by interference fit, making for a simple yet stable assembly.

Inside the housing 31, isolated air passages for cold air 311 and hot air 312 are established. The TEC cooling plate 32 is located at the front end of these air passages 311 and 312 and at the rear end of the fan 33. Specifically, the cooling end 321 of the TEC plate 32 corresponds to the cold air passage 311, while the heat-dissipating end 322 corresponds to the hot air passage 312. The housing 31 also features a hot air exhaust vent 313 connected to the hot air passage 312 and an intake vent 314 corresponding to the fan 33. The cold air vent 34 is connected to the cold air passage 311. When the cooling unit 3 is in operation, the cooling end 321 cools down and the heat-dissipating end 322 releases heat. The fan 33 directs air through the cooling end 321, turning it into cold air, which is then delivered through the cold air passage 311 to the cold air vent 34 and into the cavity 13 for body cooling. Meanwhile, the fan 33 directs air through the heat-dissipating end 322 to carry away heat, producing hot air that is expelled through the hot air passage 312 and the hot air exhaust vent 313, thus achieving heat dissipation and improving the cooling effect of the TEC cooling plate 32.

The housing 31 consists of a bottom shell 301 and a top cover 302, which are fastened together using snap-fit connections.

The side of the backpack main body 1 is equipped with a mesh bag 14. One end of the housing 31 is placed inside this mesh bag 14, and the other end, which includes the cold air nozzle 34, protrudes from the mesh bag 14. This assembly structure is extremely simple and very easy to install. The opening of the mesh bag 14 is fitted with a retractable drawstring 141, which allows for better closure and more secure placement of the cooling unit 3.

The cold air nozzle 34 is perpendicular to the housing 31 and is L-shaped. Once it's attached to the side of the backpack main body 1, it can be assembled more efficiently with the circular flexible protrusion 11, also ensuring stable assembly.

The cold air nozzle 34 is detachably mounted to the housing 31, making it easy to disassemble, replace, and maintain.

The inner chamber of the cold air nozzle 34 gradually narrows from one end to the other. This design provides a pressurizing effect when cold air passes through, making the cooling airflow more stable and thereby improving the cooling effect.

In summary, when in use, the TEC cooling plate 32 operates and the fan 33 draws external air into the housing 31, blowing it towards the cooling end 321 of the TEC plate 32. The air is then cooled and directed into the cavity 13 via the cold air nozzle 34. The cold air continuously circulates within the cavity, cooling the user's back for enhanced comfort. Compared to existing cooling backpacks, this new present invention has a simpler structure. The circular flexible protrusion 11 and the flexible support 12 are added to the backside of the backpack main body 1. They contact the user's back and offer elastic support, making the backpack more comfortable to wear. Additionally, the cooling unit 3 requires no complex operation and is easy to use. It's also detachable, facilitating maintenance. In colder weather (e.g., below 15° C.), the cooling function can be deactivated, and the cooling unit 3 can be detached from the backpack main body 1, converting it into a conventional backpack for more flexible use.

Of course, the above is just a specific embodiment of this present invention and does not limit its scope. Any equivalent changes or modifications made according to the structure, features, and principles described in the patent application for this present invention should be included within its scope.

I claim:

1. A backpack with cooling and temperature-lowering functionality comprising
    a backpack main body (1) with a cavity (10) and shoulder straps (2) mounted on the backpack main body (1), wherein
    a ring-shaped flexible protrusion (11) is placed on a backside of the backpack main body (1), upon which is a layer of flexible support (12) for contact with the human back;
    a chamber (13) is formed between the back of the backpack main body (1), the ring-shaped flexible protrusion (11), and the flexible support (12); and
    a cooling unit (3) located on an outer side of the ring-shaped flexible protrusion (11) includes
        a housing (31) detachably mounted on the backpack main body (1),
        a TEC cooling plate (32) located inside the housing (31), and
        a fan (33) for drawing external air and blowing the external air towards the cooling end (321) of the TEC cooling plate (32) to generate cold air;
    the housing (31) has a cold air nozzle (34) inserted through the ring-shaped flexible protrusion (11) and extending into the chamber (13) to input cold air.

2. The backpack with cooling and temperature-lowering functionality according to claim 1, wherein the interior of the housing (31) includes cold air channel (311) and hot air channel (312); the TEC cooling plate (32) is placed at a front end of cold air channel (311) and hot air channel (312) and at a rear end of the fan (33); the cooling end (321) of the TEC cooling plate (32) corresponds with the cold air channel (311), and the heat-dissipating end (322) of the TEC cooling plate (32) corresponds with the hot air channel (312); a heat-exhaust vent (313) is disposed on the housing (31) in communication with the hot air channel (312) and an air intake (314) is disposed on the housing (31) corresponding to the fan (33); and the cold air nozzle (34) is connected to the cold air channel (311).

3. The backpack with cooling and temperature-lowering functionality according to claim 2, wherein the housing (31) includes a bottom shell (301) and a top cover (302) that are snap-locked together.

4. The backpack with cooling and temperature-lowering functionality according to claim 1, wherein the cold air nozzle (34) is perpendicular to the housing (31) and is L-shaped.

5. The backpack with cooling and temperature-lowering functionality according to claim 1, wherein the cold air nozzle (34) is detachably mounted to the housing (31).

6. The backpack with cooling and temperature-lowering functionality according to claim 1, wherein an inner chamber of the cold air nozzle (34) gradually narrows from one end to the other.

7. The backpack with cooling and temperature-lowering functionality according to claim 6, wherein the ring-shaped flexible protrusion (11) includes an insertion port (111) that communicates with the chamber (13); and the cold air nozzle (34) is inserted through this insertion port (111).

8. The backpack with cooling and temperature-lowering functionality according to claim 6, wherein a mesh bag (14) is provided on one side of the backpack main body (1); one end of the housing (31) is inserted into this mesh bag (14), and the other end having the cold air nozzle (34) protrudes from the mesh bag (14); and the mesh bag (14) opening features a retractable drawstring (141).

9. The backpack with cooling and temperature-lowering functionality according to claim 6, wherein the ring-shaped flexible protrusion (11) is made of EVA material.

10. The backpack with cooling and temperature-lowering functionality according to claim 6, wherein the flexible support (12) is made of mesh fabric.

* * * * *